United States Patent

[11] 3,545,353

| [72] | Inventor | Allen G. Stimson<br>Rochester, New York |
|---|---|---|
| [21] | Appl. No. | 760,818 |
| [22] | Filed | Sept. 19, 1968 |
| [45] | Patented | Dec. 8, 1970 |
| [73] | Assignee | Eastman Kodak Company<br>Rochester, New York<br>a corporation of New Jersey |

[54] PNEUMATIC EXPOSURE CONTROL
9 Claims, 4 Drawing Figs.

[52] U.S. Cl..................................................... 95/10,
95/64, 352/141
[51] Int. Cl..................................................... G03b 7/08,
G03b 9/04, G03b 19/18
[50] Field of Search............................................ 95/64,
10(C); 352/141

[56] References Cited
UNITED STATES PATENTS
2,974,754  3/1961  Landbrecht................. 95/10(C)UX

| 2,981,164 | 4/1961 | Durst............................ | 95/10(C)UX |
| 2,981,167 | 4/1961 | Biedermann................. | 95/10(C)UX |
| 2,995,071 | 8/1961 | Lothrop et al............... | 95/10(C)UX |
| 3,029,719 | 4/1962 | Distel............................ | 95/10(C)UX |
| 3,324,777 | 6/1967 | Kanner.......................... | 95/64X |

*Primary Examiner*—John M. Horan
*Assistant Examiner*—Joseph F. Peters, Jr.
*Attorneys*—Robert W. Hampton and Gary D. Fields ABSTRACT: An exposure control diaphragm for a movie camera is controlled by rotation of an air motor. The motor is driven alternatively in opposite directions by a stream of air generated from a fan or blower connected to the camera film drive motor. A photocell generates a signal in response to ambient light conditions which is transmitted to a transducer having a vane in the air stream. The vane is moved in response to the signal to deflect the air stream to one side or the other of the air motor to adjust the position of the exposure control diaphragm.

ALLEN G. STIMSON
INVENTOR.

ALLEN G. STIMSON
INVENTOR.

BY Gary D. Fields
Robert W. Hampton

ATTORNEYS

PNEUMATIC EXPOSURE CONTROL

BACKGROUND OF THE INVENTION

1. Field of the Invention

This invention relate to an exposure control, and more particularly to a pneumatic exposure control for a movie camera.

2. Description of the Prior Art

Most automatic exposure controls work on the principle of converting the output of a photocell into a mechanical displacement. In some devices, the position of an exposure meter needle is sensed to set a diaphragm opening or a shutter speed. In still other devices, the exposure meter directly operates the diaphragm vanes. In some, a pointer is moved into alignment with the position of an exposure meter to set the shutter speed and/or diaphragm opening. Electronic exposure controls have been provided wherein a shutter is opened manually and the light sensed charges a capacitor to a predetermined voltage which causes the shutter to close. A problem encountered with many of these devices is that the parts required are quite expensive, particularly those which require a meter movement. In addition, the number of parts may be quite numerous, increasing costs and making the device more subject to mechanical failure.

SUMMARY OF THE INVENTION

In the present invention, a pneumatic exposure control is provided in a camera, for example, a motion picture camera. A suitable means, for example, a film drive motor, is utilized to operate a blower or fan to generate a stream of air. A vane, located in the air stream, can be deflected in one direction or the other, such as by energization of one of two coils on opposite sides of the vane by means of a control circuit connected to a photocell. A signal from the control means is indicative of whether the light striking the photocell is above or below the desired illumination level. This signal causes a deflection of the vane in one direction or the other. In a preferred embodiment, a transducer including a vane is connected to the photocell output. When the vane is deflected in one direction, air will be directed to one side of an air motor, such as a Pelton wheel so that it is turned in one direction to adjust an aperture opening and/or shutter speed setting. If the vane is deflected in the other direction, air will be directed to the opposite side of the air motor so that the exposure diaphragm moves in the opposite direction to control the size of the aperture opening and/or shutter speed. For aperture opening adjustment, the Pelton wheel may be connected to an exposure control diaphragm with an irregular shaped aperture therein. In a preferred embodiment, a second aperture is provided in the diaphragm to control the light to the photodetector to provide a self-balancing system.

The device is of simple construction, having very few mechanical parts. Thus, reliable operation is virtually assured.

Additional novel features of this invention will become apparent from the description which follows, taken in conjunction with the accompanying drawings.

DESCRIPTION OF THE PREFERRED EMBODIMENT

Figure 1:
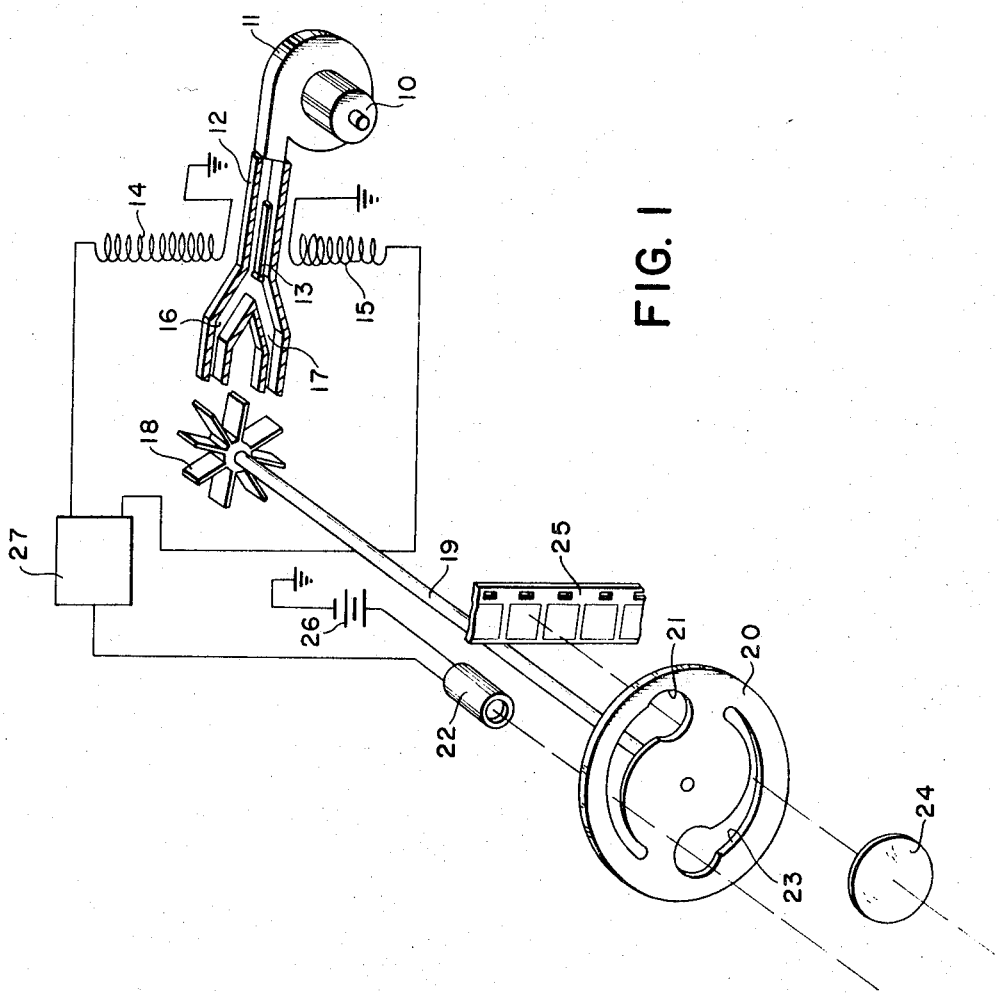
FIG. 1 is a schematic perspective view of a pneumatic exposure control of this invention, with parts broken away for clarity of illustration.

In accordance with this invention, a self-nulling or self-balancing exposure control system is provided wherein a rotatable diaphragm is pneumatically operated. The device shown in FIG. 1 has particular application in a movie camera wherein the drive motor 10 may be utilized to turn a fan or blower (not shown) in a housing 11 to generate a stream of air through a manifold 12. Within the manifold is a vane 13 which may be deflected up or down by alternative energization of either coil 14 or coil 15 to direct the stream of air through passageway 16 or 17, respectively, so that it strikes one side or the other of an air motor, such as Pelton wheel 18. Since Pelton wheel 18 is connected by a shaft 19 to an exposure control diaphragm 20 having an irregular-shaped aperture 21 for controlling the amount of light received by photocell 22, a second aperture 23 controls the amount of light from camera lens 24 which reaches film 25.

One side of photocell 22 is connected through a battery 26 to ground whereas the opposite side is connected to a trigger circuit 27. Trigger circuit 27 has two outputs, one of which is connected through coil 14 to ground and the other is connected through coil 15 to ground. Any conventional trigger circuit may be used. The trigger circuit disclosed in commonly assigned copending application Ser. No. 573,441 filed July 28, 1966, now U.S. Pat. No. 3,427,941, to Lenard M. Metzger is satisfactory.

Thus, it can be seen that if the amount of light received by photocell 22 is greater than the desired illumination required for film 25, trigger circuit 27 will provide a signal through coil 14 causing vane 13 to be deflected upwardly. Thus, more air will pass through the passageway 17 of manifold 12 causing Pelton wheel 18 to turn in a clockwise direction as viewed in FIG. 1. Thus, exposure control diaphragm 20 will also be rotated in a clockwise direction so that a smaller portion of aperture 21 is brought into optical alignment with photocell 22. Similarly, a smaller portion of aperture 23 will be brought into optical alignment with lens 24 so that film 25 is exposed to less light. If the illumination level falls below the required amount, the signal from photocell 22 will cause the trigger circuit 27 to generate a signal through coil 15 and discontinue generating a signal through coil 14 so that vane 13 is deflected downwardly. In this case, more air will pass through upper passageway 16 of manifold 12 causing Pelton wheel Pelton to turn in a counterclockwise direction so that the larger portions of apertures 21 and 23 are brought into optical alignment with photocell 22 and lens 24, respectively.

Of course, the rotation of Pelton wheel 18 may be used in other ways to control exposure, such as being connected to a shutter speed control (not sown).

Figure 2:
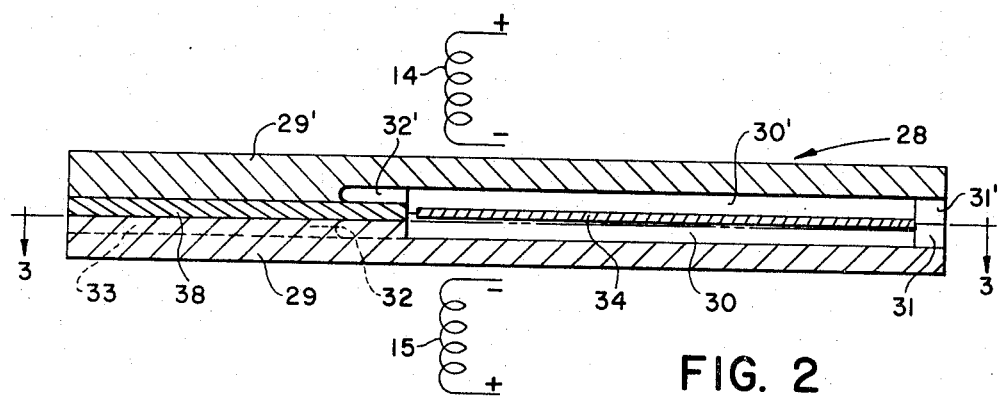
FIG. 2 is a horizontal section through a manifold of a preferred pneumatic exposure control.
Figure 3:
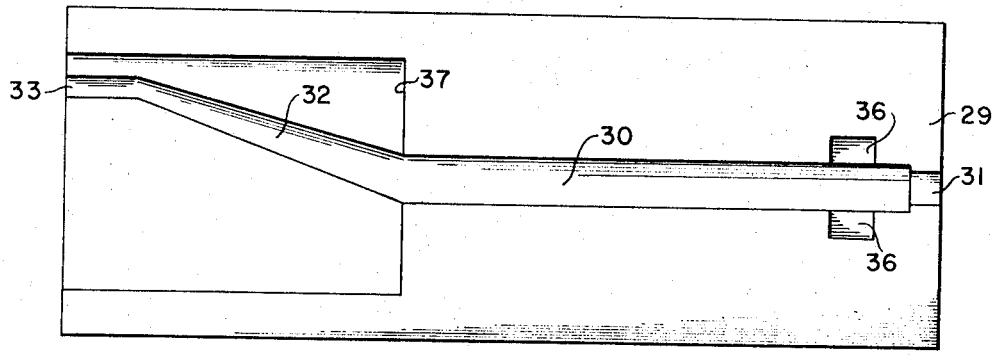
FIG. 3 is a plan view of one half of the manifold of FIG. 2 looking into the interior thereof.
Figure 4:
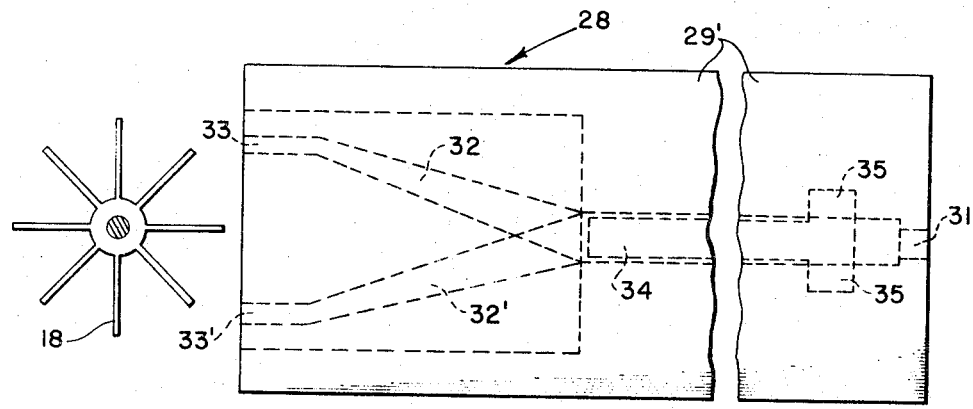
FIG. 4 is a fragmentary top plan view of the manifold of FIG. 2, showing the position of the vane and passageways in dotted lines.

Details of the construction of a preferred manifold 28 can be seen by looking at FIGS. 2—4. This manifold is made up of two identical halves 29 and 29', respectively, which when placed in mating relationship, as shown in FIGS. 2 and 4, provide spaced outlet openings which alternatively direct the air stream to opposite sides of a Pelton wheel adjacent thereto.

As seen in FIG. 3, half 29 is provided with a longitudinal channel 30 which communicates with inlet 31 at one end and with an angular passageway 32 at the other end which joins to outlet A vane 34 is adapted to be received in channel 30 and has outwardly extending ears 35, as seen in FIGS. FIGS. and 4, which are received in recesses 36 adjacent inlet 31 as shown in FIG. 3. By means of these ears, vane 34, which may be magnetic, is held rigid adjacent the opening 27 but can flex up or down within channels 30 and 30' in response to energization of coils 14 and 15, respectively. Half 29 has a generally rectangular relief 37 at the opposite end for receiving a divider plate 38, of FIGS. 1 and 2 which separates the passageways and outlet openings of the two halves when they are placed in mating relationship. It will be understood that the other half 29' is identical to half 29 with like reference numerals representing like parts.

With the parts of manifold 28 assembled, as shown in FIGS. 2 and 4, energization of one of the coils, say coil 14, will cause vane 34 to be deflected into channel 30' so that air entering inlet 31, 31' will be directed for the most part through channel 30 and passageway 32 and discharged from outlet 33 against the top portion of Pelton wheel 18 causing it to be turned in a counterclockwise direction as viewed in FIG. 4. On the other hand, when coil 15 is energized, vane 34 will be deflected into channel 30 so that most of the air passes through channel 30' and passageway 32' is discharged against the lower portion of Pelton wheel 18 causing it to be turned in a clockwise direction. As in the embodiment of FIG. 1, the movement of Pelton wheel 18 adjusts the position of an exposure control diaphragm to provide the right amount of light for exposure of the film.

From the foregoing, the advantages of this invention are readily apparent. A pneumatic exposure control system has been provided which relies for its source of power upon the camera motor. Thus, no additional power source is required for operation of the exposure control. In addition, a very economical manifold mechanism is provided wherein a vane therein can be moved in one direction or the other to cause an airstream to be deflected alternatively against the upper or lower portions of an air motor such as a Pelton wheel which is connected to an exposure control diaphragm, thereby regulating its position and the amount of light striking the film.

The invention has been described in detail with particular references to preferred embodiments thereof, but it will be understood that variations and modifications can be effected within the spirit and scope of the inventions as described hereinabove and as defined in the appended claims.

I claim:

1. A pneumatic exposure control for setting the exposure of a camera, said exposure control comprising:
    actuatable means for alternatively providing a stream of air along a first path and along second path, respectively;
    adjustable exposure setting means responsive to said stream of air along said first path for increasing the exposure setting of said camera, and responsive to said stream of air along said second path for decreasing the exposure setting of said camera; and
    photoelectric means coupled to said airstream providing means for actuating said airstream providing means in response to ambient light conditions to direct said stream of air along one of said first and second paths to adjust said exposure setting means.

2. A pneumatic exposure control for a camera, said exposure control including:
    a blower;
    drive means coupled to said blower for generating a stream of air along a path;
    actuatable air deflector means within said path of said stream of air;
    light responsive circuit means coupled to said air deflector for actuating said deflector in response to changes in ambient light conditions to deflect said airstream;
    an adjustable exposure control means movable to adjust the amount of ambient light which can strike film in said camera; and
    means responsive to deflection of said airstream coupled to said exposure control diaphragm for adjusting said exposure control means in response to said ambient light conditions so that a predetermined amount of light strikes said film to make an exposure.

3. A pneumatic exposure control, as claimed in claim 2, wherein said light responsive circuit means includes:
    a photocell responsive to changes in ambient light conditions;
    a trigger circuit connected to said photocell, said trigger circuit providing a first output signal in response to a light signal above a predetermined amount and a second output signal in response to a light level below a predetermined amount; and
    a pair of spaced coils connected to said first and second outputs of said trigger circuit, respectively, which may be energized alternatively to actuate said air deflector means.

4. A pneumatic exposure control, as claimed in claim 2, wherein said air deflector means includes:
    a manifold having an inlet and first and second outlets;
    a passageway interconnecting said inlet with each of said outlets; and
    a deflector in said passageway movable to substantially block passage of air alternatively through one of said outlets.

5. A pneumatic exposure control, as claimed in claim 2 wherein said responsive means includes:
    an air motor; and
    means interconnecting said air motor with said exposure control diaphragm, said air motor being turned in one direction in response to an airstream from one of said outlets and being turned in the opposite direction in response to an airstream through the other of said outlets to adjust said exposure control diaphragm.

6. A pneumatic exposure control, as claimed in claim 5, wherein said air motor includes:
    a Pelton wheel.

7. A pneumatic exposure control, as claimed in claim 2, wherein said drive means includes:
    a film drive motor for driving said film through said camera.

8. A manifold for a pneumatic exposure control for a camera through which a stream of air may be directed, said manifold including:
    a pair of complementary halves each half including:
        an inlet opening;
        an outlet opening offset from said inlet opening;
        a longitudinal channel interconnecting said inlet opening with said outlet opening;
    a vane positionable between said halves within said channel, said vane being movable to block an outlet opening of one of said halves to deflect said airstream through the outlet opening of the other of said halves; and
    a divider plate positionable between said halves separating said outlet of one of said halves from said outlet of the other of said halves.

9. A manifold, as claimed in claim 8, wherein the end of said vane adjacent said inlet opening includes means for attaching it to said halves; and
    an angular passageway interconnecting said channel and outlet of each of said halves, said passageways being separated by said divider plate when said halves are together.